United States Patent Office 3,381,016
Patented Apr. 30, 1968

3,381,016
ISOXAZOLO[5,4-b]PYRIDINE DERIVATIVES AND A METHOD FOR THEIR PREPARATION
John H. Markillie, Cooper, Mich., assignor to The Upjohn Company, Kalamazoo, Mich., a corporation of Delaware
No Drawing. Filed Mar. 4, 1966, Ser. No. 531,730
8 Claims. (Cl. 260—296)

This invention relates to novel isoxazoles and to novel processes for their preparation. It is more particularly directed to novel isoxazoles represented by the formulae

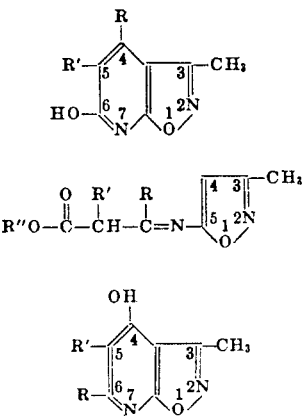

wherein R is selected from the group consisting of lower alkyl, phenyl, lower-alkylphenyl, lower-alkoxyphenyl and halophenyl, R' has the same meaning as R and in addition hydrogen, and R" is selected from the group consisting of methyl and ethyl; also the acid addition salts of the compounds embraced by the above Formulae I and Ia.

As used in this specification, the term "halophenyl" means halogen-substituted phenyl wherein the halogen is selected from chlorine, bromine, iodine, and fluorine; the term "lower-alkoxyphenyl" means phenyl substituted with one or more alkoxys of from 1 to 4 carbon atoms, inclusive, e.g., methoxyphenyl, trimethoxyphenyl, ethoxyphenyl, propoxyphenyl, butoxyphenyl, dibutoxyphenyl, and isomeric forms thereof; the term "lower-alkylphenyl" means phenyl substituted with one or more alkyls of from 1 to 4 carbon atoms, inclusive, e.g., tolyl, xylyl, trimethylphenyl, ethylphenyl, butylphenyl, and isomeric forms thereof.

The novel isoxazolo[5,4-b]pyridinols of Formulae I and Ia exist either in the nonprotonated (free base) form or in the protonated (acid addition salt) form depending on the pH of the environment. They form stable protonates, i.e., acid addition salts, on neutralization with suitable acids, for example, hydrochloric, hydrobromic, sulfuric, phosphoric, nitric, acetic, benzoic, salicyclic, glycolic, succinic, nicotinic, tartaric, maleic, malic, pamoic, methanesulfonic, cyclohexanesulfamic, picric, and lactic acids, and the like. These acid addition salts are useful for upgrading the free bases. The free bases are useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The novel Formula I and Formula Ia compounds form salts with fluosilicic acid which are useful as mothproofing agents according to U.S. Patents 1,915,334 and 2,075,359. They also form salts with thiocyanic acid which condense with formaldehyde to form resinous materials useful as pickling inhibitors according to U.S. Patents 2,425,320 and 2,606,155 They also form salts with tri chloracetic acid which are useful as herbicides, for example, against Johnson grass, yellow foxtail, green foxtail, Bermuda grass, and quackgrass. The compounds of Formula Ia inhibit the growth of influenza and Coe viruses.

The compounds of Formula IIa inhibit the growth of *Aspergillus flavus*

The novel isoxazolo[5,4-b]pyridin-6-ols of Formula I are prepared by treating the known compound 5-amino-3-methylisoxazole of the formula

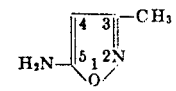

with a corresponding β-keto ester of the formula

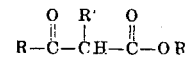

wherein R, R' and R" have the same meaning as above, in the presence of an acid catalyst 5-amino-3-methylisoxazole (II) is known in the art, it can be prepared by reacting 3-iminobutyronitrile with hydroxylamine; also by the procedure described in Ann 624, 22 (1959)

The β-keto esters of Formula III are well known in the art and a wide variety of them have been prepared by known methods, e.g., in accordance with Volume 1, page 297 of "Organic Reactions," John Wiley and Sons, Inc., New York, 1942 Among these β-keto esters that can be employed in the novel process are ethyl acetoacetate, ethyl 2-ethylacetoacetate, methyl 2-ethylacetoacetate, ethyl 2-butylacetoacetate, methyl 2-buylacetoacetate, ethyl 2-phenylacetoacetate, methyl 2-phenylacetoacetate, ethyl 3-oxohexanoate, ethyl benzoylacetate, methyl benzoylacetate, ethyl p-toluoylacetate, methyl p-toluoylacetate, ethyl 2,3,4-trimethoxybenzoylacetate, methyl 2,3,4-trimethoxy benzoylacetate and the like Suitable acid catalysts include, for example, concentrated sulfuric acid, phosphorus pentoxide, phosphorus pentachloride, polyphosphoric acid and the like, the lattermost being preferred.

In carrying out the reaction between 5-amino-3-methyl-isosoxazole (II) and the β-keto esters of Formula III, the two reactants are mixed with the acid catalyst and the mixture heated, e.g., between about 50° C. and about 175° C., preferably between about 100° C and about 150° C. Inert solvents are not necessary but can be employed, if desired. The molecular ratios of the compounds of Formula II and Formula III can be varied, substantially equimolar ratios having been found satisfactory. The time required for the completion of the reaction depends upon such factors as the reaction temperature, the particular reactants employed, the relative amounts of reactants, thoroughness of mixing, and the like. Therefore, it will be understood that the optimum reaction time will vary for each set of reaction conditions. Ordinarily, reaction times ranging from about 10 minutes to about 1 hour are suitable. After completion of the reaction, the reaction mixture is diluted with water and can be neutralized with a base (e.g., ammonium hydroxide) and the thus-produced isoxazalo[5,4-b]pyridin-6-ol of Formula I isolated from the reaction mixture in its free base form, using conventional procedures such as filtration, solvent evaporation, solvent extraction, chromatography or crystallization, or a combination of these methods. Each of the free bases so obtained can be purified, e.g., by recrystallization from a suitable solvent or pair of solvents. The free base can be converted to any desired acid addition salt by neutralization with an acid, e.g., any of those given above The novel alkyl 3-[(3 - methyl - 5 - isoxazol,1)imino] alkanoate esters of Formula IIa are prepared by treating 5-amino-3-methylisoxazole     II 

with a corresponding β-keto ester of the formula

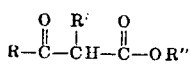     III wherein R, R', and R" have the same meaning as above.

Typical β-keto esters of Formula III that can be employed in this reaction include those that can be used in the preparation of the compounds of Formula I, set forth above.

In carrying out the reaction between 5-amino-3-methylisoxazole (II) and the β-keto esters of Formula III, no catalyst is employed and the two reactants are mixed and heated at relatively low temperatures, e.g., between about 25° C. and about 150° C., preferably between about 50° C. and about 125° C. Inert solvents are not necessary, but can be employed, if desired. The molecular ratio of the compounds of Formulae II and III can be varied, substantially equimolar ratios having been found satisfactory. The time required for the completion of the reaction depends upon such factors as the reaction temperature, the particular reactants employed, the relative amounts of reactants, thoroughness of mixing, and the like. Therefore, it will be understood that the optimum reaction time will vary for each set of reaction conditions. Ordinarily, reaction times ranging from about 2 hours to about 1 week are suitable. After completion of the reaction, the product is isolated from the reaction mixture by conventional procedures such as solvent extraction, chromatography or recrystallization, or a combination of these methods.

The novel isoxazolo[5,4-]pyridine-4-ols of Formula Ia are prepared by heating a corresponding compound of the formula

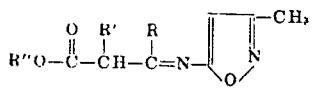     IIa wherein R, R' and R" have the same meaning as above.

In carrying out the foregoing reaction, the appropriate compound of Formula IIa is added to any inert high boiling solvent (such as Dowtherm A, mineral oil, naphthalene, decalin, tetralin and the like) preferably at the desired reaction temperature, and keeping the high-temperature reaction time at a minimum, so as to prevent decomposition of starting materials (IIa) and products (Ia). Satisfactory reaction temperatures are between about 200° C. and about 275° C. The time required for the completion of the reaction depends upon such factors as the reaction temperature, the particular reactant employed, the particular inert solvent, thoroughness of mixing, and the like. Therefore it will be understood that the optimum reaction time will vary for each set of reaction conditions. Ordinarily, reaction times within the range of between about 5 minutes and about 10 minutes are suitable. After completion of the reaction, the product is isolated from the reaction mixture by conventional procedures such as filtration, solvent extraction, chromatography or recrystallization, or a combination of these methods.

The following examples are illustrative of the process and products of the present invention, but are not to be construed as limiting.

Example 1.—3,4-dimethylisoxazolo[5,4]pyridine-6-ol (I)

A mixture of 9.8 g. (0.1 mole) of 5-amino-3-methylisoxazole (II) and 15 ml. (0.12 mole) of ethyl acetoacetate (III) in about 15 ml. of polyphosphoric acid was heated slightly and the temperature rose rapidly to the range of about 120 to about 140° C. The reaction mixture was heated at 140° C. for between about 15 and 20 minutes, then cooled to room temperature; 100 ml. of water was added and concentrated ammonium hydroxide added until the pH of the mixture was 7. The resulting mixture was cooled and filtered. The crude product (I) obtained was recrystallized from 30 ml. of dimethylformamide to give 3.4 g. (20% yield) of 3,4-dimethylisoxazolo[5,4-b]pyridin-6-ol (I) having a melting point of 250 to 252° C.

Analysis.—Calcd. for $C_8H_8N_2O_2$: C, 58.53; H, 4.91; N, 17.07. Found: C, 58.66; H, 5.20; N, 17.11.

Infrared and nuclear magnetic resonance (NMR) spectra support the structure of the thus-produced compound.

The addition of a diethyl ether solution of hydrogen chloride, hydrogen bromide, sulfuric acid, phosphoric acid, acetic acid, benzoic acid, salicyclic acid, citric acid, succinic acid, malic acid, cylohexanesulfamic acid, or trichloroacetic acid, etc. to an ethanol solution of 3,4-dimethylisoxazolo[5,4-b]pyridin-6-ol, followed by evaporation to dryness, gives the corresponding acid addition salt.

Example 2.—3,4,5-trimethylisoxazolo[5,4-b]pyridin-6-ol (I)

A mixture of 8.8 g. (0.09 mole) of 5-amino-3-methylisoxazole (II) and 15 ml. (0.1 mole) of ethyl 2-methylacetoacetate (III) in about 15 ml. of polyphosphoric acid was warmed slowly to the range of about 150 to about 170° C. The reaction mixture was stirred at this temperature for 30 minutes. The reaction mixture was cooled and about 250 ml. of water was added and the mixture was stirred for several hours. The solid that separated was collected and recrystallized from 75 ml. of absolute ethanol to give 800 mg. (5% yield) of 3,4,5-trimethylisoxazolo[5,4-b]pyridin-6-ol (I), melting at 241 to 243° C.

Analysis.—Calcd. for $C_9H_{10}N_2O_2$: C, 60.66; H, 5.66; N, 15.72. Found: C, 60.98; H, 5.53; N, 15.76.

Infrared and NMR spectra support the structure.

The addition of a diethyl ether solution of hydrogen chloride, hydrogen bromide, sulfuric acid, phosphoric aicd, acetic acid, benzoic acid, salicyclic acid, citric acid, succinic acid, malic acid, cyclohexanesulfamic acid, or trichloroacetic acid, etc. to an ethanol solution of 3,4,5-trimethylisoxazolo[5,4-b]pyridin-6-ol, followed by evaporation to dryness, gives the corresponding acid addition salt.

Following the general procedures of the process for preparing the compounds of Formula I described above and the methods set forth in Examples 1 and 2, but employing the following β-keto esters of Formula III:

(1) ethyl 2-ethylacetoacetate,
(2) ethyl 2-isopropylacetoacetate,
(3) ethyl 2-propylacetoacetate,
(4) ethyl 2-butylacetoacetate,
(5) ethyl 2-isobutylacetoacetate,
(6) ethyl 2-sec.-butylacetoacetate,
(7) ethyl 2-phenylacetoacetate,
(8) ethyl 2-(o-chlorophenyl)acetoacetate,
(9) ethyl 2-(p-methoxyphenyl)acetoacetate,
(10) ethyl 2-(p-ethoxyphenyl)acetoacetate,
(11) ethyl 3-oxohexanoate,
(12) ethyl 2-methyl-3-oxohexanoate,
(13) ethyl 5-methyl-3-oxohexanoate,
(14) ethyl 3-oxovalerate,
(15) ethyl 2-methyl-3-oxovalerate,
(16) ethyl 2-phenyl-3-oxovalerate,
(17) ethyl 3-oxoheptanoate,
(18) ethyl benzoylacetate,
(19) ethyl 2-benzoyl-2-phenylacetate,
(20) ethyl m-chlorobenzoylacetate,
(21) ethyl p-chlorobenzoylacetate,
(22) ethyl p-toluoylacetate,
(23) ethyl p-methoxybenzoylacetate,
(24) ethyl p-ethoxybenzoylacetate,

(25) ethyl (2,3,4-trimethoxybenzoyl)acetate,
(26) ethyl (2,5-dimethylbenzoyl)acetate and
(27) ethyl 2-benzoylbutyrate, yields, respectively, (1) 3,4-dimethyl-5-ethylisoxazolo[5,4-b]pyridin-6-ol,
(2) 3,4-dimethyl-5-isopropylisoxazolo[5,4-b]pyridin-6-ol,
(3) 3,4-dimethyl-5-propylisoxazolo[5,4-b]pyridin-6-ol,
(4) 3,4-dimethyl-5-butylisoxazolo[5,4-b]pyridin-6-ol,
(5) 3,4-dimethyl-5-isobutylisoxazolo[5,4-b]pyridin-6-ol,
(6) 3,4-dimethyl-5-sec.-butylisoxazolo[5,4-b]pyridin-6-ol,
(7) 3,4-dimethyl-5-phenylisoxazolo[5,4-b]pyridin-6-ol,
(8) 3,4-dimethyl-5-(o-chlorophenyl)isoxazolo[5,4-b]pyridin-6-ol,
(9) 3,4-dimethyl-5-(p-methoxyphenyl)isoxazolo[5,4-b]pyridin-6-ol,
(10) 3,4-dimethyl-5-(p-ethoxyphenyl)isoxazolo[5,4-b]pyridin-6-ol,
(11) 3-methyl-4-propylisoxazolo[5,4-b]pyridin-6-ol,
(12) 3,5-dimethyl-4-propylisoxazolo[5,4-b]pyridin-6-ol,
(13) 3-methyl-4-isobutylisoxazolo[5,4-b]pyridin-6-ol,
(14) 3-methyl-4-ethylisoxazolo[5,4-b]pyridin-6-ol,
(15) 3,5-dimethyl-4-ethylisoxazolo[5,4-b]pyridin-6-ol,
(16) 3-methyl-4-ethyl-5-phenylisoxazolo[5,4-b]pyridin-6-ol,
(17) 3-methyl-4-butylisoxazolo[5,4-b]pyridin-6-ol,
(18) 3-methyl-4-phenylisoxazolo[5,4-b]pyridin-6-ol,
(19) 3-methyl-4,5-diphenylisoxazolo[5,4-b]pyridin-6-ol,
(20) 3-methyl-4-(m-chlorophenyl)isoxazolo[5,4-b]pyridin-6-ol,
(21) 3-methyl-4-(p-chlorophenyl)isoxazolo[5,4-b]pyridin-6-ol,
(22) 3-methyl-4-(p-methylphenyl)isoxazolo[5,4-b]pyridin-6-ol,
(23) 3-methyl-4-(p-methoxyphenyl)isoxazolo[5,4-b]pyridin-6-ol,
(24) 3-methyl-4-(p-ethoxyphenyl)isoxazolo[5,4-b]pyridin-6-ol,
(25) 3-methyl-4-(2,3,4-trimethoxyphenyl)isoxazolo[5,4-b]pyridin-6-ol,
(26) 3-methyl-4-(2,5-dimethylphenyl)isoxazolo[5,4-b]pyridin-6-ol, and
(27) 3-methyl-4-phenyl-5-ethylisoxazolo[5,4-b]pyridin-6-ol.

Following the procedure of the preceding paragraph but substituting methyl 2-ethylacetoacetate, methyl 2-isopropylacetoacetate, methyl 2-propylacetoacetate, etc. for ethyl 2-ethylacetoacetate, ethyl 2-isopropylacetoacetate, ethyl 2-propylacetoacetate, etc. also yields, respectively, 3,4 - dimethyl - 5 - ethylisoxazolo[5,4-b]pyridin - 6 - ol, 3,4 - dimethyl - 5 - isopropylisoxazolo[5,4-b]pyridin - 6 - ol, 3,4 - dimethyl - 5 - propylisoxazolo[5,4-b]pyridin - 6 - ol, etc.

Example 3.—Ethyl 3-[(3-methyl-5-isoxazolyl)imino]butyrate (IIa)

A solution of 21 g. (0.215 mole) of 5-amino-3-methylisoxazole (II) and 30 ml. (0.236 mole) of ethyl acetoacetate (III) was prepared by heating these reactants on a steam bath. It was allowed to stand at room temperature for about 96 hours, then filtered and the filtrate concentrated under high vacuum. Upon cooling the residue crystallized. This material was recrystallized from a 1:1 solution of isopropanol and water to give 17.5 g. of ethyl 3 - [(3 - methyl - 5 - isoxazolyl)imino]butyrate (IIa), melting at 67.5 to 68° C.

Analysis.—Calcd. for $C_{10}H_{14}N_2O_3$: C, 57.13; H, 6.71; N, 13.33. Found: C, 57.23; H, 6.71; N, 13.39

The NMR spectrum supports the structure.

Following the general procedures of the process for preparing the compounds of Formula IIa described above and the method set forth in Example 3, but employing the following β-keto esters of Formula III (1) ethyl 2-ethylacetoacetate,
(2) ethyl 2-isopropylacetoacetate,
(3) ethyl 2-propylacetoacetate,
(4) ethyl 2-butylacetoacetate,
(5) ethyl 2-isobutylacetoacetate,
(6) ethyl 2-sec.-butylacetoacetate,
(7) ethyl 2-phenylacetoacetate,
(8) ethyl 2-(o-chlorophenyl)acetoacetate,
(9) ethyl 2-(p-methoxyphenyl)acetoacetate,
(10) ethyl 2-(p-ethoxyphenyl)acetoacetate,
(11) ethyl 3-oxohexanoate,
(12) ethyl 2-methyl-3-oxohexanoate,
(13) ethyl 5-methyl-3-oxohexanoate,
(14) ethyl 3-oxovalerate,
(15) ethyl 2-methyl-3-oxovalerate,
(16) ethyl 2-phenyl-3-oxovalerate,
(17) ethyl 3-oxoheptanoate,
(18) ethyl benzoylacetate,
(19) ethyl 2-benzoyl-2-phenylacetate,
(20) ethyl m-chlorobenzoylacetate,
(21) ethyl p-chlorobenzoylacetate,
(22) ethyl p-toluoylacetate,
(23) ethyl p-methoxybenzoylacetate,
(24) ethyl p-ethoxybenzoylacetate,
(25) ethyl (2,3,4-trimethoxybenzoyl)acetate,
(26) ethyl (2,5-dimethylbenzoyl)acetate, and
(27) ethyl 2-benzoylbutyrate, yields, respectively, (1) ethyl 2-ethyl-3-[(3-methyl-5-isoxazolyl)imino]butyrate,
(2) ethyl 2-isopropyl-3-[(3-methyl-5-isoxazolyl)imino]butyrate,
(3) ethyl 2-propyl-3[(3-methyl-5-isoxazolyl)imino]butyrate,
(4) ethyl 2-butyl-3-[(3-methyl-5-isoxazolyl)imino]butyrate,
(5) ethyl 2-isobutyl-3-[(3-methyl-5-isoxazolyl)imino]butyrate,
(6) ethyl 2-sec.butyl-3-[(3-methyl-5-isoxazolyl)imino]butyrate,
(7) ethyl 2-phenyl-3-[(3-methyl-5-isoxazolyl)imino]butyrate,
(8) ethyl 2-(o-chlorophenyl)-3-[(3-methyl-5-isoxazolyl)imino]butyrate,
(9) ethyl 2-(p-methoxyphenyl)-3-[(3-methyl-5-isoxazolyl)imino]butyrate,
(10) ethyl 2-(p-ethoxyphenyl)-3-[(3-methyl-5-isoxazolyl)imino]butyrate,
(11) ethyl 3-[(3-methyl-5-isoxazolyl)imino]hexanoate,
(12) ethyl 2-methyl-3-[(3-methyl-5-isoxazolyl)imino]hexanoate,
(13) ethyl 5-methyl-3-[(3-methyl-5-isoxazolyl)imino]hexanoate,
(14) ethyl 3-[(3-methyl-5-isoxazolyl)imino]valerate,
(15) ethyl 2-methyl-3-[(3-methyl-5-isoxazolyl)imino]valerate,
(16) ethyl 2-phenyl-3-[(3-methyl-5-isoxazolyl)imino]valerate,
(17) ethyl 3-[(3-methyl-5-isoxazolyl)imino]heptanoate,
(18) ethyl 3-phenyl-3-[(3-methyl-5-isoxazolyl)imino]propionate,
(19) ethyl 2,3-diphenyl-3-[(3-methyl-5-isoxazolyl)imino]propionate,
(20) ethyl 3-(m-chlorophenyl)-3-[(3-methyl-5-isoxazolyl)imino]propionate,
(21) ethyl 3-(p-cholrophenyl)-3-[(3-methyl-5-isoxazolyl)imino]propionate,
(22) ethyl 3-(p-methylphenyl)-3-[(3-methyl-5-isoxazolyl)imino]propionate,
(23) ethyl 3-(p-methoxyphenyl)-3-[(3-methyl-5-isoxazolyl)imino]propionate,
(24) ethyl 3-(p-ethoxyphenyl)-3-[(3-methyl-5-isoxazolyl)imino]propionate,

(25) ethyl 3-(2,3,4-trimethoxyphenyl)-3-[(3-methyl-5-isoxazolyl)imino]propionate,
(26) ethyl 3-(2,5-dimethylphenyl)-3-[(3-methyl-5-isoxazolyl)imino]propionate and
(27) ethyl 2-ethyl-3-phenyl-3-[(3-methyl-5-isoxazolyl)imino]propionate Following the procedure of the preceding paragraph but substituting methyl 2-ethylacetoacetate, methyl 2-isopropylacetoacetate, methyl 2-propylacetoacetate, etc. for ethyl 2-ethylacetoacetate, ethyl 2-isopropylacetoacetate, ethyl 2-propylacetoacetate, etc., yields, respectively, methyl 2 - ethyl - 3-[(3 - methyl-5-isoxazolyl)imino]butyrate, methyl 2-isopropyl-3-[(3-methyl-5-isoxazolyl)imino]butyrate, methyl 2-propyl-3-[(3-methyl-5-isoxazolyl)imino]butyrate, etc.

Example 4.—3,6-dimethylisoxazolo[5,4-b]pyridin-4-ol
(Ia)

To 10 ml. of Dowtherm A (a mixture of biphenyl and diphenyl ether) heated to about 240 to 245° C., 1 g. of solid ethyl 3 - [(3 - methyl - 5-isoxazolyl)imino]butyrate (IIa) (prepared as in Example 3) was slowly added. The resulting solution was heated briefly (about 6 minutes), then cooled and filtered. The product was collected and recrystallized from ethanol to yield 200 mg. of 3,6-dimethylisoxazolo[5,4-b]pyridin-4-ol (Ia) melting at 255 to 258° C.

Analysis.—Calcd. for $C_8H_8N_2O_2$: C, 58.53; H, 4.91; N, 17.07. Found: C, 58.90; H, 5.07; N, 16.85.

Infrared and NMR spectra support the structure.

The addition of a diethyl ether solution of hydrogen chloride, hydrogen bromide, sulfuric acid, phosphoric acid, acetic acid, benzoic acid, salicyclic acid, citric acid, succinic acid, malic acid, cyclohexanesulfamic acid, or trichloroacetic acid, etc. to an ethanol solution of 3,6-dimethylisoxazolo[5,4-b]pyridin-4-ol, followed by evaporation to dryness, gives the corresponding acid addition salt.

Following the general procedures of the process for preparing the compounds of Formula Ia described above and the method set forth in Example 4, but employing the following compounds of Formula IIa:

(1) ethyl 2-ethyl-3-[(3-methyl-5-isoxazolyl)imino]butyrate,
(2) ethyl 2-isopropyl-3-[(3-methyl-5-isoxazolyl)imino]butyrate,
(3) ethyl 2-propyl-3-[(3-methyl-5-isoxazolyl)imino]butyrate,
(4) ethyl 2-butyl-3-[(3-methyl-5-isoxazolyl)imino]butyrate,
(5) ethyl 2-isobutyl-3-[(3-methyl-5-isoxazolyl)imino]butyrate,
(6) ethyl 2-sec.-butyl-3-[(3-methyl-5-isoxazolyl)imino]butyrate,
(7) ethyl 2-phenyl-3-[(3-methyl-5-isoxazolyl)imino]butyrate,
(8) ethyl 2-(o-chlorophenyl)-3-[(3-methyl-5-isoxazolyl)imino]butyrate,
(9) ethyl 2-(p-methoxyphenyl)-3-[(3-methyl-5-isoxazolyl)imino]butyrate,
(10) ethyl 2-(p-ethoxyphenyl)-3-[(3-methyl-5-isoxazolyl)imino]butyrate,
(11) ethyl 3-[(3-methyl-5-isoxazolyl)imino]hexanoate,
(12) ethyl 2-methyl-3-[(3-methyl-5-isoxazolyl)imino]hexanoate,
(13) ethyl 5-methyl-3-[(3-methyl-5-isoxazolyl)imino]hexanoate,
(14) ethyl 3-[(3-methyl-5-isoxazolyl)imino]valerate,
(15) ethyl 2-methyl-3-[(3-methyl-5-isoxazolyl)imino]valerate,
(16) ethyl 2-phenyl-3-[(3-methyl-5-isoxazolyl)imino]valerate,
(17) ethyl 3-[(3-methyl-5-isoxazolyl)imino]heptanoate,
(18) ethyl 3-phenyl-3-[(3-methyl-5-isoxazolyl)imino]propionate,
(19) ethyl 2,3-diphenyl-3-[(3-methyl-5-isoxazolyl)imino]propionate,
(20) ethyl 3-(m-chlorophenyl)-3-[(3-methyl-5-isoxazolyl)imino]propionate,
(21) ethyl 3-(p-chlorophenyl)-3-[(3-methyl-5-isoxazolyl)imino]propionate,
(22) ethyl 3-(p-methylphenyl)-3-[(3-methyl-5-isoxazolyl)imino]propionate,
(23) ethyl 3-(p-methoxyphenyl)-3-[(3-methyl-5-isoxazolyl)imino]propionate,
(24) ethyl 3-(p-ethoxyphenyl)-3-[(3-methyl-5-isoxazolyl)imino]propionate,
(25) ethyl 3-(2,3,4-trimethoxyphenyl)-3-[(3-methyl-5-isoxazolyl)imino]propionate,
(26) ethyl 3-(2,5-dimethylphenyl)-3-[(3-methyl-5-isoxazolyl)imino]propionate and
(27) ethyl 2-ethyl-3-phenyl-3-[(3-methyl-5-isoxazolyl)imino]propionate, yields, respectively, (1) 3,6-dimethyl-5-ethylisoxazolo[5,4-b]pyridin-4-ol,
(2) 3,6-dimethyl-5-isopropylisoxazolo[5,4-b]pyridin-4-ol,
(3) 3,6-dimethyl-5-propylisoxazolo[5,4-b]pyridin-4-ol,
(4) 3,6-dimethyl-5-butylisoxazolo[5,4-b]pyridin-4-ol,
(5) 3,6-dimethyl-5-isobutylisoxazolo[5,4-b]pyridin-4-ol,
(6) 3,5-dimethyl-5-sec.butylisoxazolo[5,4-b]pyridin-4-ol,
(7) 3,5-dimethyl-5-phenylisoxazolo[5,4-b]pyridin-4-ol,
(8) 3,6-dimethyl-5-(o-chlorophenyl)isoxazolo[5,4-b]pyridin-4-ol,
(9) 3,6-dimethyl-5-(p-methoxyphenyl)isoxazolo[5,4-b]pyridin-4-ol,
(10) 3,6-dimethyl-5-(p-ethoxyphenyl)isoxazolo[5,4-b]pyridin-4-ol,
(11) 3-methyl-6-propylisoxazolo[5,4-b]pyridin-4-ol,
(12) 3,5-dimethyl-6-propylisoxazolo[5,4-b]pyridin-4-ol,
(13) 3-methyl-6-isobutylisoxazolo[5,4-b]pyridin-4-ol,
(14) 3-methyl-6-ethylisoxazolo[5,4-b]pyridin-4-ol,
(15) 3,5-dimethyl-6-ethylisoxazolo[5,4-b]pyridin-4-ol,
(16) 3-methyl-6-ethyl-5-phenylisoxazolo[5,4-b]pyridin-4-ol,
(17) 3-methyl-6-butylisoxazolo[5,4-b]pyridin-4-ol,
(18) 3-methyl-6-phenylisoxazolo[5,4-b]pyridin-4-ol,
(19) 3-methyl-5,6-diphenylisoxazolo[5,4-b]pyridin-4-ol,
(20) 3-methyl-6-(m-chlorophenyl)isoxazolo[5,4-b]pyridin-4-ol,
(21) 3-methyl-6-(p-chlorophenyl)isoxazolo[5,4-b]pyridin-4-ol,
(22) 3-methyl-6-(p-methylphenyl)isoxazolo[5,4-b]pyridin-4-ol,
(23) 3-methyl-6-(p-methoxyphenyl)isoxazolo[5,4-b]pyridin-4-ol,
(24) 3-methyl-6-(p-ethoxyphenyl)isoxazolo[5,4-b]pyridin-4-ol,
(25) 3-methyl-6-(2,3,4-trimethoxyphenyl)isoxazolo[5,4-b]pyridin-4-ol,
(26) 3-methyl-6-(2,5-dimethylphenyl)isoxazolo[5,4-b]pyridin-4-ol, and
(27) 3-methyl-6-phenyl-5-ethylisoxazolo[5,4-b]pyridin-4-ol

I claim:

1. A compound selected from the group consisting of
(1) a compound of the formula

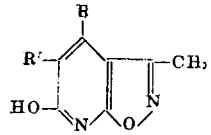

wherein R is selected from the group consisting of lower alkyl, phenyl, lower-alkylphenyl, lower-alkoxyphenyl and halophenyl, R' has the same meaning as R and in addition hydrogen, and (2) an acid addition salt thereof 2. A compound of claim 1 wherein R is methyl and R' is hydrogen, namely, 3,4-dimethylisoxazolo [5,4-b]pyridin-6-ol.

3. A compound of claim 1 wherein R and R' are methyl, namely, 3,4,5-trimethylisoxazolo[5,4-b]pyridin-6-ol.

4. A process for the production of a compound of the formula

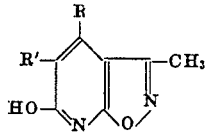

wherein R is selected from the group consisting of lower-alkyl, phenyl, lower-alkylphenyl, lower-alkoxlyphenyl and halophenyl and R' has the same meaning as R and in addition hydrogen, which comprises treating 5-amino-3-methylisoxazole with a compound of the formula

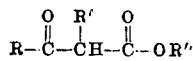

wherein R and R' have the same meaning as above and R'' is selected from the group consisting of methyl and ethyl, in the presence of an acid catalyst.

5. A compound selected from the group consisting of (1) a compound of the formula

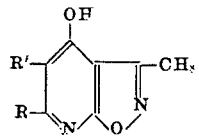

wherein R is selected from the group consisting of lower-alkyl, lower-alkylphenyl, lower-alkoxyphenyl and halophenyl, R' has the same meaning as R and in addition hydrogen, and (2) an acid addition salt thereof 6. A compound of claim 5 wherein R is methyl and R' is hydrogen, namely, 3,6-dimethylisoxazolo[5,4-b]pyridin-4-ol.

7. A process for the production of a compound of claim 5 of the formula

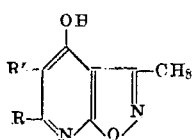

wherein R is selected from the group consisting of lower-alkyl, phenyl, lower-alkylphenyl, lower-alkoxyphenyl and halophenyl and R' has the same meaning as R and in addition hydrogen, which comprises the steps of
(1) treating 5-amino-3-methylisoxazole with a corresponding compound of the formula

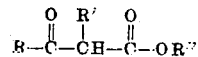

wherein R and R' have the same meaning as above and R'' is selected from the group consisting of methyl and ethyl, to yield a corresponding compound of the formula

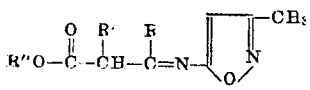

wherein R, R' and R'' have the same meaning as above, and
(2) heating the latter compound 8. A process for the production of a compound of claim 5 of the formula

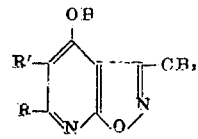

wherein R is selected from the group consisting of lower-alkyl, phenyl, lower-alkylphenyl, lower-alkoxyphenyl and halophenyl and R' has the same meaning as R and in addition hydrogen, which comprises heating a corresponding compound of the formula

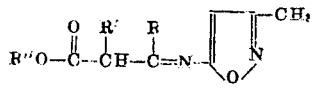

wherein R and R' have the same meaning as above and R'' is selected from the group consisting of methyl and ethyl.

References Cited

Breslow et al., J. Am. Chem. Soc., vol. 79, pp. 3756-3760 (1957).

JOHN D. RANDOLPH, *Primary Examiner*

A. J. ROTMAN, *Assistant Examiner*